(12) United States Patent
Mehendale et al.

(10) Patent No.: US 7,729,885 B2
(45) Date of Patent: Jun. 1, 2010

(54) CORIOLIS TYPE FLOW MEASURING SYSTEM WITH ANALOG TO DIGITAL CONVERTERS HAVING AN ADJUSTABLE SAMPLING FREQUENCY

(75) Inventors: Aditya Mehendale, Ruurlo (NL); Ronald Wilhelmus Johannes Hoitink, Beltrum (NL)

(73) Assignee: Berkin B.V., Ruurlo (NL)

( * ) Notice: Subject to any disclaimer, the term of this patent is extended or adjusted under 35 U.S.C. 154(b) by 0 days.

(21) Appl. No.: 12/205,048

(22) Filed: Sep. 5, 2008

(65) Prior Publication Data

US 2009/0064796 A1 Mar. 12, 2009

(30) Foreign Application Priority Data

Sep. 7, 2007 (NL) .................................. 1034349

(51) Int. Cl.
*G06F 17/40* (2006.01)
*G01F 1/84* (2006.01)
(52) U.S. Cl. ................................... 702/187; 73/861.356
(58) Field of Classification Search ............ 73/861.355, 73/861.356; 702/187
See application file for complete search history.

(56) References Cited

U.S. PATENT DOCUMENTS

| | | | |
|---|---|---|---|
| 2003/0014198 A1 | 1/2003 | Kramer et al. | |
| 2003/0126932 A1 | 7/2003 | Brockhaus | |
| 2005/0034537 A1* | 2/2005 | Henry et al. | 73/861.355 |
| 2006/0243062 A1* | 11/2006 | Henry et al. | 73/861.12 |
| 2007/0262814 A1* | 11/2007 | Patten et al. | 327/553 |

FOREIGN PATENT DOCUMENTS

| | | |
|---|---|---|
| EP | 0 898 152 A1 | 2/1999 |
| EP | 1 191 310 A2 | 3/2002 |
| EP | 1 719 983 A1 | 11/2006 |

* cited by examiner

*Primary Examiner*—Aditya Bhat
(74) *Attorney, Agent, or Firm*—Young & Thompson (57) ABSTRACT

Coriolis type flow measuring system for measuring the mass flow rate of a flowing medium, includes a flow tube and sensors associated with the flow tube for generating analog signals corresponding to the movement of the tube, analog to digital conversion elements for converting the analog sensor signals into digitized signals with a sampling frequency, and elements for calculating the mass flow rate from the digitized signals, which system is provided with members for causing the sampling of the sensor signals to take place with a number of different frequencies, elements for continuously measuring the rate at which the flow changes, and elements for selecting a predefined sampling frequency in dependence on the rate of change thus measured.

22 Claims, 6 Drawing Sheets

CORIOLIS TYPE FLOW MEASURING SYSTEM WITH ANALOG TO DIGITAL CONVERTERS HAVING AN ADJUSTABLE SAMPLING FREQUENCY

The invention relates to a Coriolis type flow measuring system for measuring the mass flow (or 'flow' for short hereinafter) of a flowing medium, comprising a flow tube and drive means for causing the flow tube to oscillate about an axis of rotation, sensors associated with the flow tube for generating analog signals in positions in accordance with the movement of the tube, analog to digital conversion (ADC) means for converting the analog signals into digitized output signals with a sampling frequency, and means for calculating a (flow) measuring signal from the digitized output signals with a certain calculation frequency, which (flow) measuring signal is representative of the mass flow.

Such a Coriolis type flow measuring system is known from EP 1 719 983, which discloses measuring systems with two or three motion sensors.

Measuring systems with two, three or more sensors require a corresponding number of converters for converting the analog sensor signals into digital signals suitable for further processing. This results in a comparatively high power dissipation. Moreover, a high speed of high-resolution data requires a considerable processor power for converting the signals into practicable information. This implies in the converter as well as in the processor:

a) a high power dissipation,
b) a high heat dissipation.

A high heat dissipation is particularly undesirable in a Coriolis instrument because the generated heat causes temperature gradients in the instrument, which result in thermal stresses and a degradation of the instrument's performance. In fact, any measuring principle is sensitive to measuring errors owing to temperature gradients to a greater or lesser degree, and temperature fluctuations are accordingly undesirable.

The invention has for its object to provide a Coriolis type flow measuring system of the kind described in the opening paragraph which does not suffer the above disadvantages, or at least does so to a lesser degree.

According to the invention, the Coriolis type flow measuring system is for this purpose characterized by means for causing the sampling of the sensor signals to take place with a number of different frequencies, means for measuring the rate at which the (flow) measuring signal changes, and selection means for selecting a predefined sampling frequency in dependence on the rate of change thus measured. The rate of change of the flow may be determined during every calculation step. This means that a few additional lines of software have to be run along with the rest each time, which is called continuous measurement. Alternatively, said few lines of software may be activated only once in every so many calculation cycles (for example once every 10 or 100 cycles): this is called intermittent measuring.

On the one hand high sampling frequencies are necessary for ensuring a satisfactory operation, while on the other hand there is the wish to minimize power consumption and heat dissipation. According to the invention, both objects are achieved in that an additional processing block is used with which the change in speed of the sensor information is determined (i.e. how quickly the flow, and thus the measuring signal, changes). Depending on a criterion that is set, this block changes the frequency with which the sensor signals are digitized (and possibly also the frequency with which the digitized sensor signals are processed).

When the flow is substantially constant, for example, a lower response speed of the flowmeter or flow controller can suffice; the criterion is inactive, and the instrument dissipates less and operates more coolly. When the rate of change of the measuring signal is higher, the criterion is activated and the conversion (and processing) frequencies are temporarily set to higher values. This leads to a temporarily higher response speed.

The invention is of advantage not only with the use of two sensors, but is of particular advantage in Coriolis type measuring systems with more than two, for example three sensors.

An embodiment of the Coriolis type measuring system according to the invention in this respect is characterized by a flow tube with drive means for causing the flow tube to oscillate about an axis of rotation, and with sensors a, b, and c that are associated with the flow tube for generating analog signals in three positions in dependence on the movement of the tube, wherein the positions of the sensors a and b are symmetrical relative to the axis of rotation and the position of the sensor c is coaxial with those of the sensors a and b.

Within the framework of the invention, the entire process may be adapted (delayed or speeded up) in that both the sampling frequency and the frequency of the flow calculations are adapted (version 1). Alternatively, the sampling frequency only is adapted while the calculation frequency remains constant (version 2).

Calculation always takes place with a low frequency in version 2, whereas in version 1 the calculation in the case of a high rate of change of the flow is carried out with a high(er) frequency. As a result, the energy consumption is lower in version 2 than in version 1.

The sampling frequency and the calculation frequency (in version 1) may be adapted mutually independently, but preferably simultaneously. A practical embodiment comprises that the sampling frequency and the calculation frequency (in version 1) are coupled such that the adaptations are carried out not only simultaneously, but also by the same factor.

Software is used in the invention which calculates the rate of change of the flow continuously or discontinuously. When this rate of change exceeds a certain value, the software instructs the A/D converter (ADC) to start sampling with a higher frequency. In version 1, the software may then at the same time adapt an internal parameter that governs the calculation frequency.

The calculation frequency is kept constant in version 2, so it is not coupled to the sampling frequency.

The ADC means in a practical embodiment comprise a clock divider that is programmed to provide a plurality of different sampling frequencies so as to render an adaptation of the sampling in a desired number of steps possible A simple embodiment is characterized in that the frequency of the clock divider can be selected between a first sampling frequency (stationary mode) and a second, higher sampling frequency (dynamic mode), wherein the second sampling frequency may be a multiple of the first sampling frequency;

the selection means are designed to select the second sampling frequency when during implementation of the first sampling frequency the flow measured over a given time frame changes by more than a predetermined value;

the selection means are designed to select the first sampling frequency when during implementation of the second sampling frequency the flow measured over a given time frame changes by less than a predetermined value (in this case and in the preceding case said predetermined value may amount to for example, a percentage, for example 40%, of the actual or nominal measuring range);

the selection means are designed to maintain a selected sampling frequency for a predetermined period of time or until a flow variation of the same kind occurs, in which case the measurement of said period of time is started anew.

In a practical embodiment, the high sampling frequency is maintained, for example, for 10 seconds (or a comparable period of time).

In an embodiment, a number of samples (for example two or four) are averaged in the dynamic mode.

The above embodiments may be applied to a Coriolis measuring system in which the sampling frequency and the calculation frequency are adapted (version 1) as well as to a system in which the sampling frequency only is adapted and the calculation frequency remains constant (version 2).

The invention also relates to a method of measuring the mass flow of a flowing medium wherein the rate of change of the measured flow is used for adapting the sampling interval.

The invention also relates to the use of an algorithm (a rule for processing sensor signals) for the calculation of the flow, which algorithm is associated in particular with a low pass filter. In a preferred embodiment, the low pass filter is associated with means for adapting its parameters in dependence on the sampling frequency.

Use of low pass filter in version 1: at a high rate of change of the flow more noise can be permitted, therefore an 'adapted' (faster) end filter may be effective in version 1.

Use of low pass filter in version 2: the adaptation of the filter parameters to the rate of change is especially useful in the case of a change in the number of samples per calculation. More samples lead to less noise, which may then be (partly) sacrificed in favor of a faster response.

A few embodiments of the invention will be explained in more detail with reference to the drawings.

Figure 1:
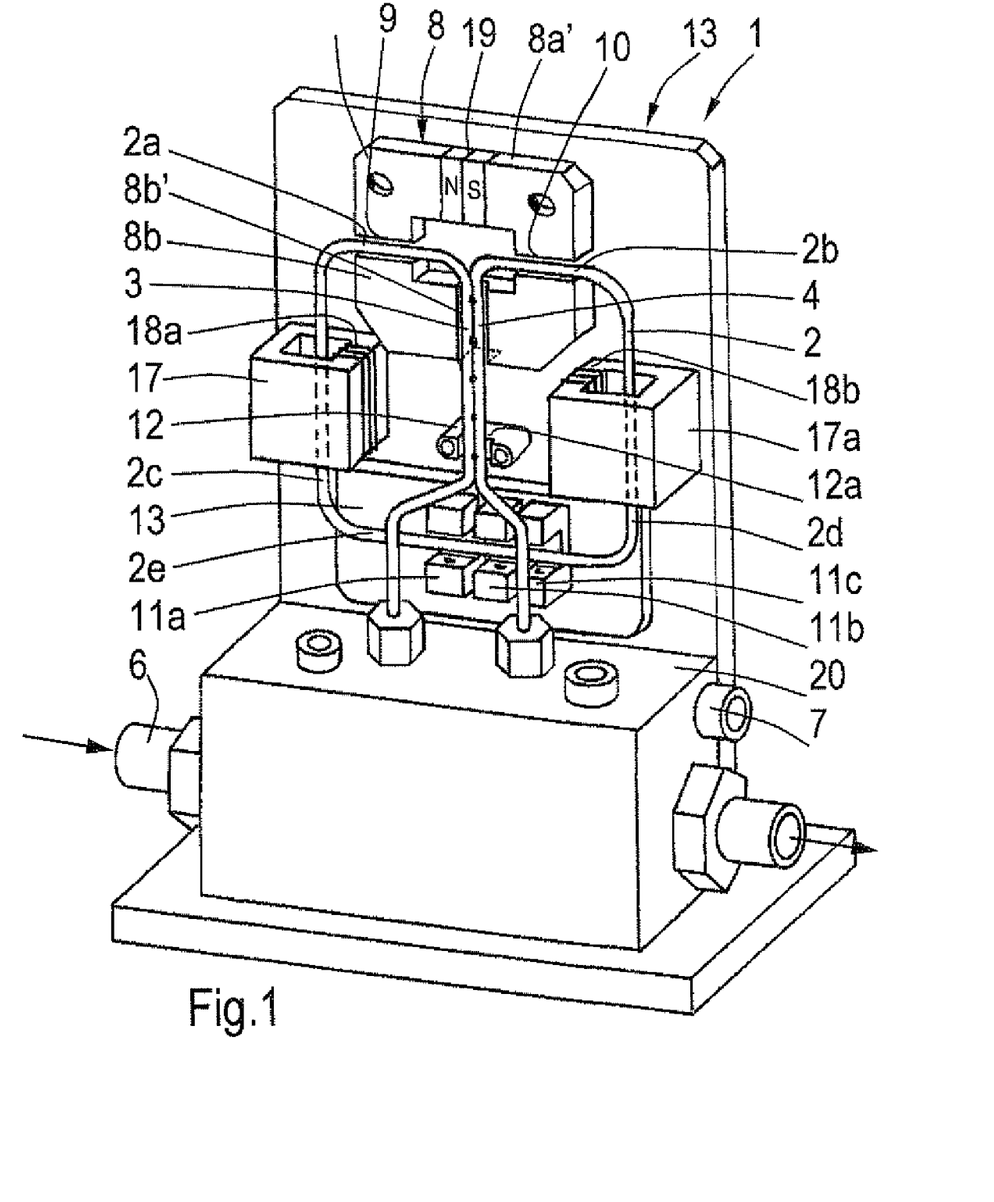
FIG. 1 shows a Coriolis type flow measuring system comprising a Coriolis tube with three sensors.

FIG. 1 shows a special embodiment of a flowmeter 1 of the Coriolis type (however, the invention is applicable to all types of Coriolis tubes) comprising a looped sensing tube 2 bent into a rectangular shape that follows a substantially circumferential path (forming a substantially fully closed turn). The looped sensing tube 2 comprises two parallel lateral tube parts 2c, 2d, which are connected at one end to a first transverse tube part 2e and at the other end to two second transverse tube parts 2a, 2b. The latter are connected to a (flexible) feed tube 3 and a (flexible) discharge tube 4 for a flowing medium at the side opposite to where they are connected to the lateral tubes 2c, 2d. The tube 2 in its entirety has been bent into a rectangle whose corners are rounded so as to make bending into this shape possible. The feed tube 3 is connected to a feed line 6 via a connection block 20, and the discharge tube 4 is similarly connected to a discharge line 7. The feed and discharge tubes 3, 4 in this embodiment extend within the loop 2 and are fastened to a frame 13 by fastening means 12. The flexible feed and discharge tubes 3, 4 do not form part of the rectangular loop shape of the sensing tube 2 but provide a flexible fastening of the loop 2 to the frame 13. The loop 2 may accordingly be regarded as being flexibly suspended by means of the feed and discharge tubes. It may be, for example, a stainless steel tube with an outer diameter of approximately 0.7 mm and a wall thickness of approximately 0.1 mm. Depending on the outer dimensions of the loop 2 and the pressure the tube is to be able to withstand (for example 100 bar), the outer diameter of the tube will in general be smaller than 1 mm and the wall thickness 0.2 mm or less.

The tubes 3 and 4, which extend close together on either side of and symmetrically with respect to the main axis of symmetry S of the tube 2, are fastened to the fastening means 12, for example by clamping, soldering or welding, said means 12 in their turn being fastened to the frame 13. An alternative is to fasten the tubes 3, 4 directly to the frame 13.

In the construction of FIG. 1, excitation means for causing the loop 2 to rotate about the main axis of symmetry (in this case the primary axis or excitation axis) comprise a magnetic yoke 8 that is fastened to the frame 13, that is provided with a permanent magnet 19, and that has two air gaps 9 and 10 through which portions 2a and 2b (denoted first transverse tubes above) of the looped tube 2 extend, as well as means for introducing an electric current into the tube 2. In FIG. 1 these are means for generating an electric current in the tube 2 through induction. The permanently magnetic magnet yoke 8 has two upper yoke parts 8a and 8a' that are separated from a lower yoke part 8b by the air gaps 9 and 10. The permanent magnet 19 is arranged between the yoke parts 8a and 8a' with its one (North) pole facing the yoke part 8a and its other (South) pole facing the yoke part 8a'.

Current is induced in the tube by means of two transformer cores 17, 17a which are each provided with a respective electric coil 18a, 18b and through each of which a respective lateral tube part 2c, 2d is passed. The coils 18a, 18b may be wound on the inner sides of the transformer cores, as shown, or on one of the other sides. The combination of the mutually oppositely directed magnetic fields that are generated in the gaps 9 and 10 of the permanently magnetic yoke 8 and are transverse to the direction of the current on the one hand and an (AC) current induced in the tube 2 on the other hand exerts a torque on the tube owing to which the latter starts rotating (i.e. oscillating or vibrating, in the so-termed twist mode) about the axis of rotation.

When a medium is flowing through the tube, the tube will start to oscillate about a response axis that is transverse to the axis of rotation under the influence of Coriolis forces (in the so-termed swing mode). In operation the (sinusoidal) displacements of points of the tube part 2e, which are representative of the flow, are detected by a Coriolis effect sensor, in this case comprising a first sensor 11a placed adjacent the tube part 2e and a second sensor 11b. The first and the second sensor are arranged directly against one another symmetrically with respect to the excitation axis of rotation adjacent the point of intersection thereof with the tube part 2e. A third sensor 11c may serve for correction purposes. The sensors may be, for example, of an electromagnetic, inductive, capacitive, or ultrasonic type. In the embodiment of FIG. 1, however, optical sensors have been opted for. So-termed optoelectronic sensors 11a, 11b, and 11c are used as the optical sensors, each having a U-shaped housing that is fastened to the frame 13, with a light source (for example an LED) in one leg of the U and in the other leg a light-measuring cell (for example a phototransistor) arranged opposite the light source. The tube part 2e, or a vane fastened thereto, is capable of moving between the legs of the U-shaped sensor housings 11a, 11b (and 11c, if present), thereby intercepting more or less light from the light source.

Figure 2:
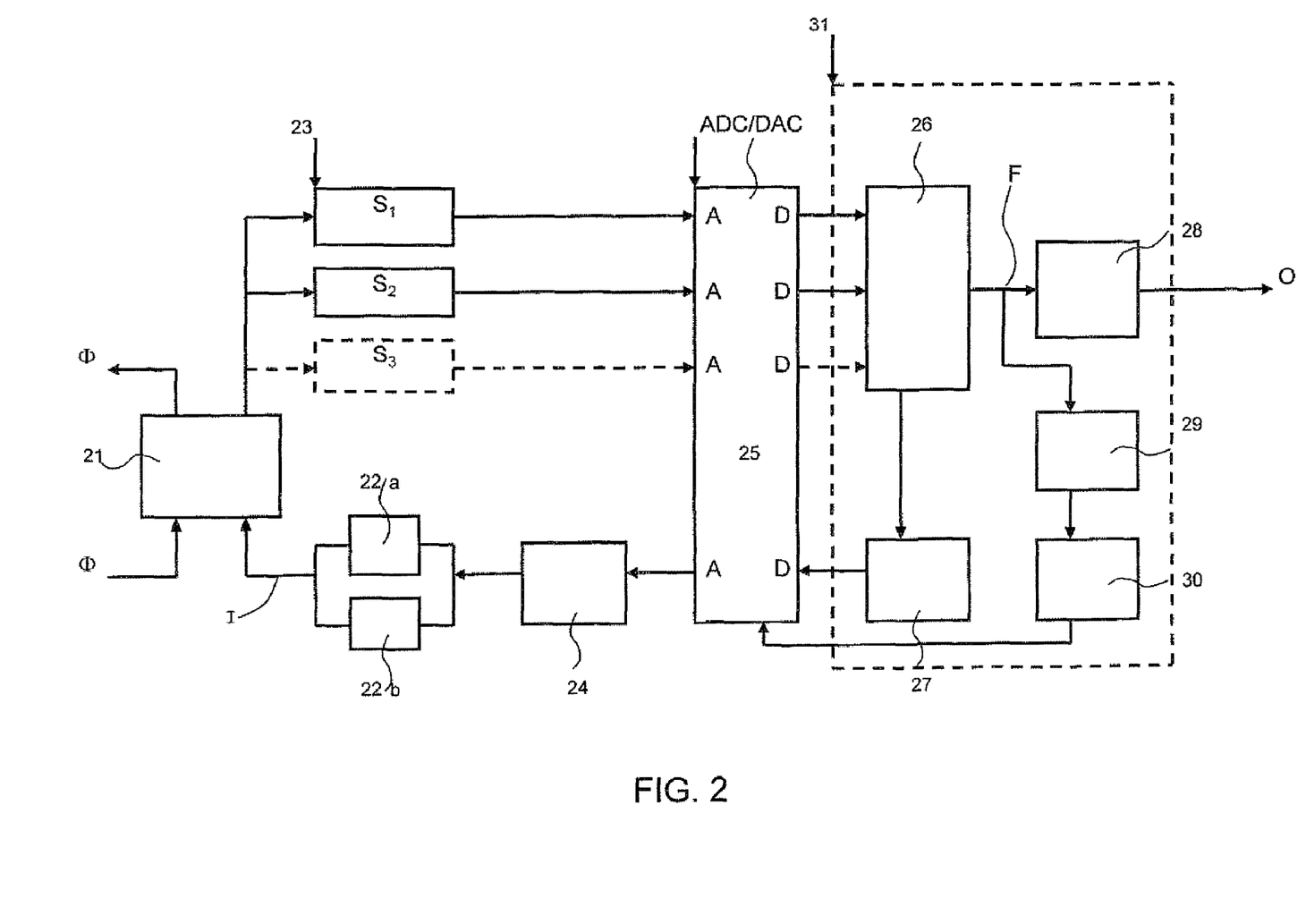
FIG. 2 is a block diagram of the processing of the signals of the sensors of the flow measuring system.

FIG. 2 is a block diagram showing the operation of an embodiment of the Coriolis flowmeter according to the invention. An electric current I is induced in a Coriolis tube system 21 by means of two coils 22a, 22b wound on two cores. The coils 22a, 22b are supplied by an amplifier 24 which is controlled from a digital signal processor 27 via an AD/DA converter (ADC/DAC) 25. A magnetic field that is transverse to the direction of the current I is applied to the tube system 21. The tube system 21, or a portion thereof will start performing an oscillatory movement under the influence of this field and I. An oscillation that arises from Coriolis forces is superimposed on this oscillatory movement when a medium Φ flows through the tube system 21. The movements of the tube system 21 are measured by sensors S1 and S2, or sensors S1, S2 and S3. The analog signals from the sensors S1, S2 (S3) are fed to the AD/DA converter 25. The output signals of the AD/DA converter 25 are supplied to a (digital) signal processor 26. The digital signal processor 26 generates an output signal O representing the mass flow via an end filter 28.

Calculation units ('processors') in measuring instruments, such as the Coriolis flowmeter described above, often operate digitally, i.e. they perform their operations on the basis of rows of bits: zeros and ones. Switching-over of these bits takes place in a regular sequence of discrete moments in time controlled by a clock in or connected to the calculation unit. Some processes in such a measuring instrument, however, still take place in the analog, i.e. continuous time domain. This is the case for two processes in a Coriolis flowmeter: measuring the displacements of the tube by means of two or more displacement sensors. The sensors operate on an optical, inductive, capacitive, or comparable principle. The result is a signal that changes continuously in time;
controlling the actuator that causes the tube to carry out a sinusoidal movement by means of a signal that is also continuous and sinusoidal.

Figure 3:
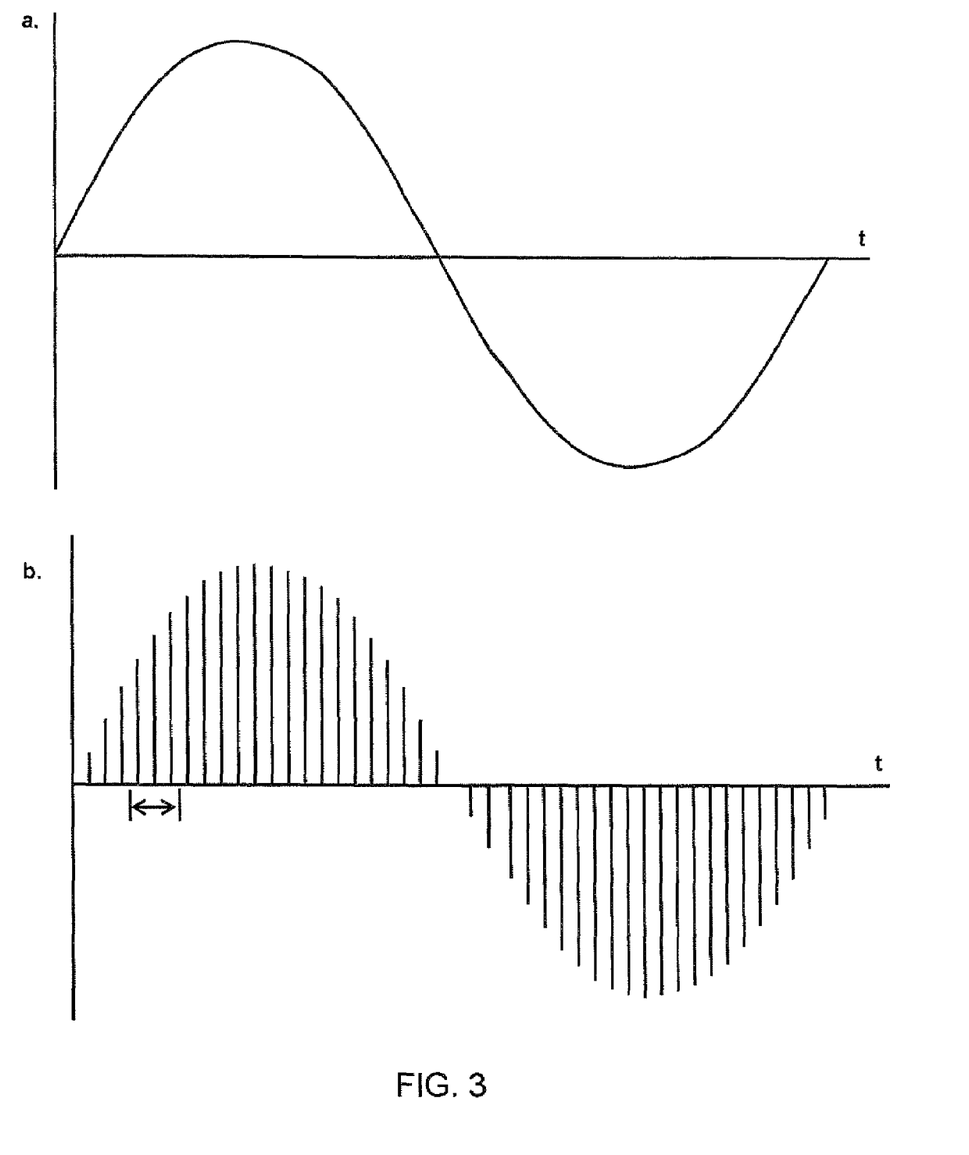
FIG. 3 illustrates the movement of a point of the Coriolis tube in time and the sampling thereof in the form of a (sinusoidal) curve.
Figure 4:
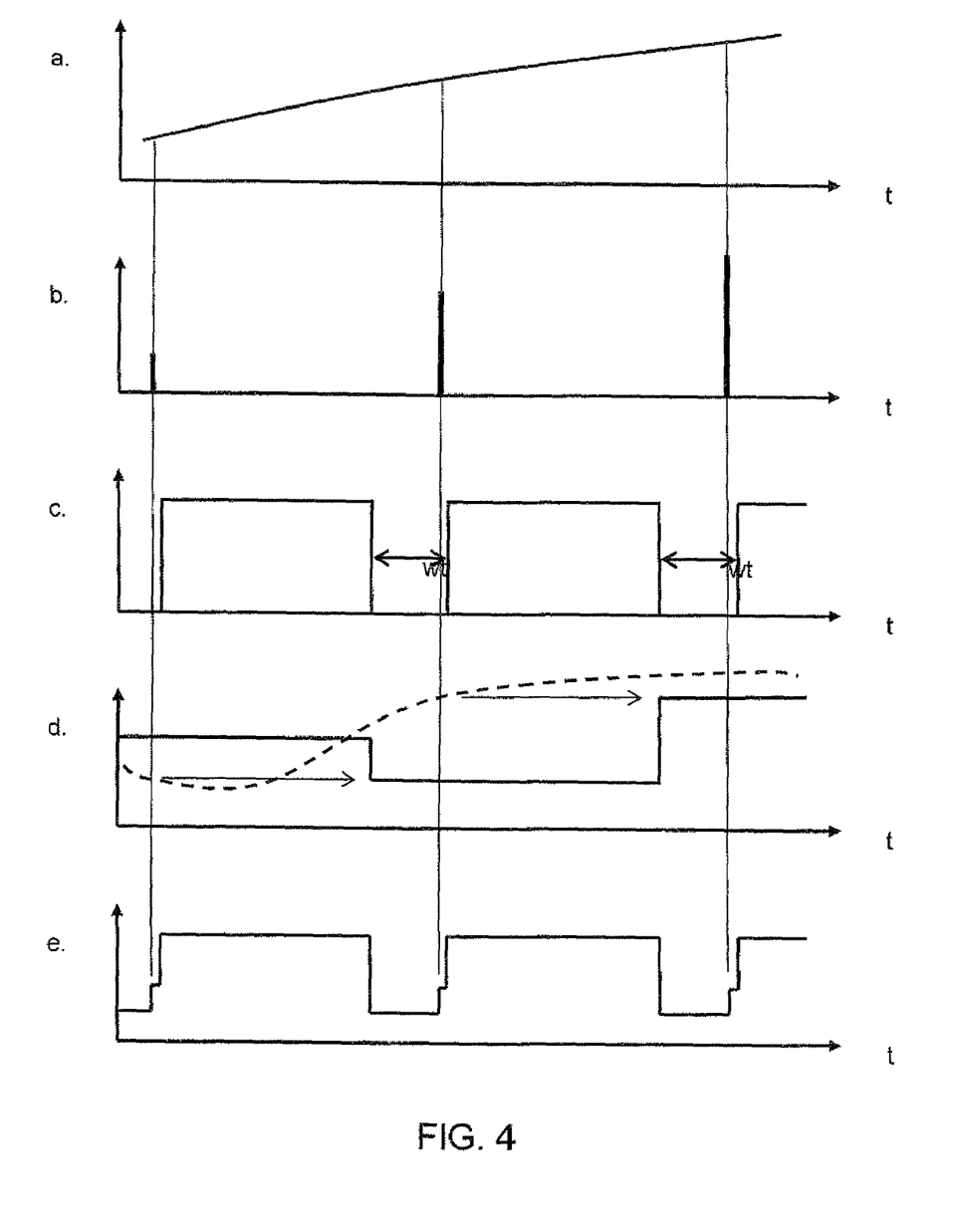
FIG. 4 shows the signal from a sensor for a portion of the displacement of FIG. 3, as well as the situation in which the sampling is adapted while the calculation intervals remain the same (referred to as version 2 hereinafter)

The present invention relates to the measurement of the displacements, and more in particular to the conversion from analog to digital, which is also denoted sampling. FIG. 3a shows the movement, usually sinusoidal, of a point of the tube. Usual values for the vibration frequency are between 100 and 500 Hz. The sampling frequency may be between 10 and 100 Hz, so that up to 100 samples are to be taken in one period, as is indicated with vertical lines in FIG. 3b. FIG. 4 takes a closer look on an enlarged scale at a region d indicated with a double arrow. Sampling is carried out by a specific chip called the A/D converter or ADC. Conversion in the other direction is then performed by a DAC. ADC and DAC are often accommodated in one chip that is called Codec.

FIG. 2 shows the individual elements. Block 25 represents the ADC/DAC. In the upper portion the two or three sensor signals are converted from A into D and in the lower portion the actuator signal is converted from D into A. Block 26 is the flow calculation unit or flow processor. Low pass filter 28 at the output thereof is drawn separately, though in fact it forms part of the processor. The ADC/DAC chip has its own internal clock which runs substantially more slowly than that of the processor. This is because the processor has to carry out a large series of calculations on the most recently measured signals in between two sampling moments of the ADC. Typical values for the clock frequency of the processor are 50 to 100 MHz, and for the clock frequency of the ADC 10 to 100 kHz. The sampling interval must be wider than the calculation time taken up by one series of calculations. This is clarified by FIG. 4, which shows the small region d indicated with a double arrow in FIG. 3b on an enlarged scale.

FIG. 4a shows a small portion of the sinusoidal displacement of one position of the Coriolis tube measured by one of the two or three displacement sensors, wherein the arrows indicate the value of the flow during sampling. Such a small portion of the sine is practically a straight line.

FIG. 4b shows the (very short) samples of the amplitude taken by one of the sensors in the form of pulses. It is to be noted that the interval between two moments in time is no more than 0.0001 s even at a sampling frequency of 10 kHz.

FIG. 4c shows the time duration of the calculations, starting after the sampling (processing). There is always some residual time between individual calculations, also to be regarded as a waiting time (wt).

FIG. 4d shows the flow as presented, for example, on a display after the calculations by the instrument have been completed. It is apparent that this flow may increase as well as decrease. The broken line indicates the actual, continuously changing flow, which obviously runs ahead of the displayed flow by the calculation time.

FIG. 4e shows the energy consumption of the processor plus ADC, which at the same time is a measure for the heat dissipation. This is lower during the waiting time.

An aspect of the invention is that it is favorable to choose the sampling interval of a Coriolis measuring instrument as large as possible so as to achieve as low as possible an energy consumption and heat dissipation. This sampling takes place with a fixed frequency in known flowmeters. In a situation in which the flow does not or substantially not change over time, the sampling interval may be increased, up to a few times the processing time period, without the measuring accuracy being significantly impaired. The energy consumption and heat dissipation, however, are reduced thereby. Averaging of a number of sampling values also offers the possibility of reducing the influence of measuring noise on the output signal.

The essence of the invention is that the rate of change of the measured flow is used for adjusting the sampling interval of the ADC. A small interval (i.e. a high sampling frequency) is used in the case of a high rate of change, a wide interval in the case of a low rate of change.

Figure 5:
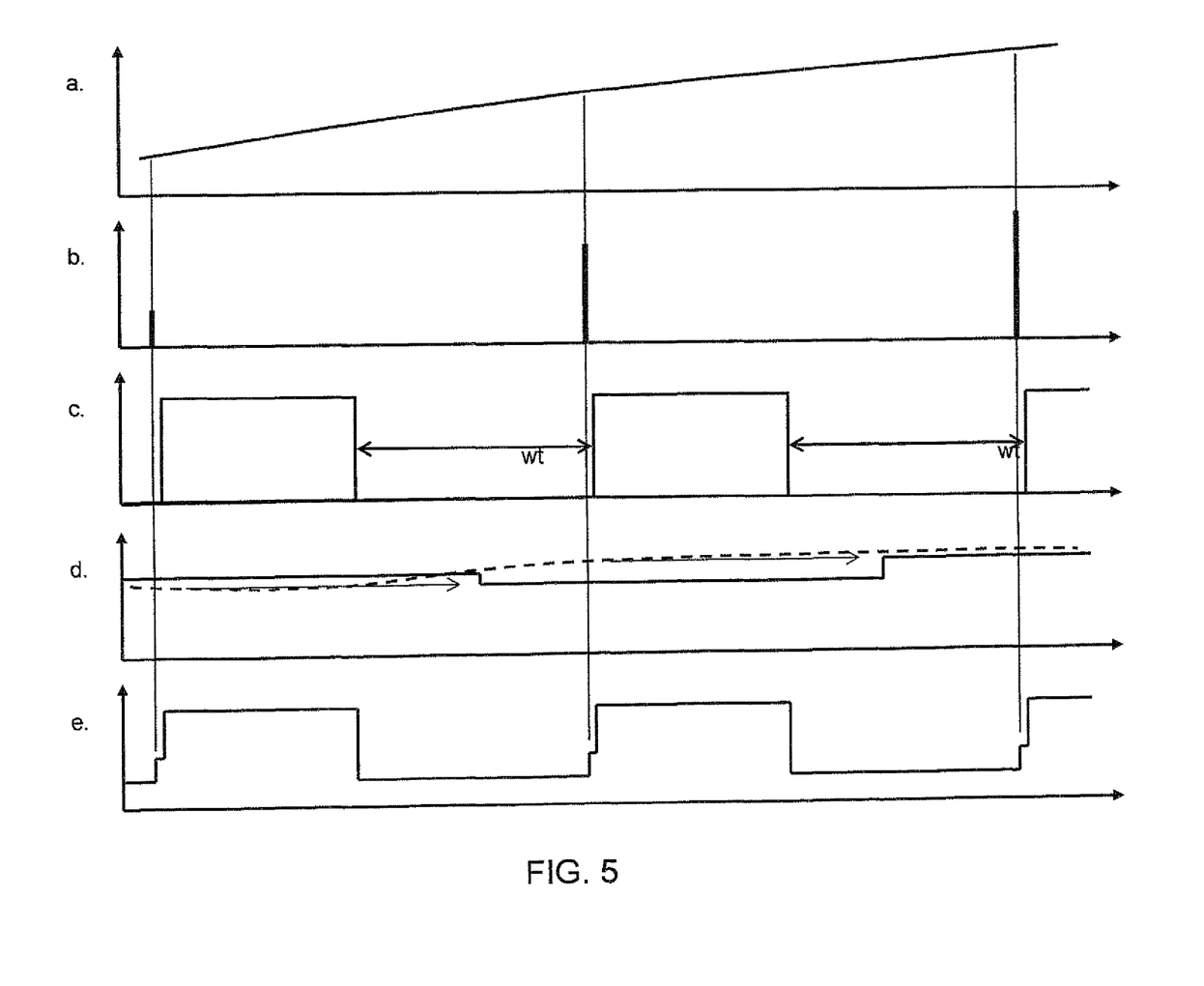
FIG. 5 shows the signal from a sensor for a portion of the displacement of FIG. 3, as well as the situation in which both the sampling and the calculation intervals are adapted (referred to as version 1 hereinafter)

Version 1: both the sampling frequency of the ADC and the interval of the calculations are adapted. This is graphically depicted in FIG. 5. The principle is based on an increase in the time interval between the samples being taken (FIG. 5b) for a low rate of change of the flow (FIG. 5d), so that the waiting time in the processor becomes longer relative to the calculation time (FIG. 5c), and accordingly the average energy consumption will be lower (FIG. 5e). The following situation will occur in practice: the sampling frequency is normally low and will be temporarily stepped up in the case of a fast change in the flow. The sampling frequency could be adapted in a continuous (stepless) manner, but the AD 1939 Codec widely used in practice allows only three steps: these are 24, 48 and 96 kHz with the use of a specific crystal (clock).

The mass flow is expressed in the unit kg/s. The rate of change of the mass flow accordingly has the unit (kg/s)/s=kg/s$^2$. A sampling frequency that can be continuously adapted can be made proportional, linearly or otherwise, to the rate of change of the mass flow. If no more than a few steps are possible, ranges may be defined, for example in the case of three steps: high=more than 60% of the actual [cf. note on p. 3] measuring range within one second; medium=30 to 60%; low=0 to 30%.

Embodiments of Version 1 adaptation of the sampling frequency and the flow calculation coupled thereto is proportional to the rate of change of the flow;

the sampling frequency and the flow calculation coupled thereto are adapted in a plurality of discrete steps for predetermined ranges of the rate of change of the flow;

the sampling frequency and the flow calculation coupled thereto are adapted in two or three discrete steps for predetermined ranges of the rate of change of the flow;

each of the three embodiments listed above, wherein the calculation frequency is not equal to the sampling frequency but an integer number of times smaller, so that several samples are taken for each calculation.

Version 2: the sampling frequency of the ADC only is adapted here, while the calculation frequency (the number of calculations per second) is kept constant. This method renders a flexible compromise possible between a desired response speed and an admissible noise level, while the energy consumption is reduced.

In the first three embodiments of version 1 described above, at least one sample is taken per calculation. An average of the samples is taken if several samples are used. The version 2 under discussion here has the characteristic that the number of samples per calculation is made dependent on the rate of change of the flow: as the rate of change is higher, more samples will be taken for each calculation. A calculation example for triple rate: the calculation is carried out at a fixed frequency of 12 kHz and the sampling frequency rises with an increase in the rate of change of the flow from 12 to 24 and to 48 kHz (requiring a 2× slower crystal for the Codec than for the values presented by way of example for version 1). 2 and 4 samples can be averaged for the two values mentioned last above, respectively.

In other words: the sampling frequency (AD frequency) is always coupled to the calculation frequency in version 1. They need not be the same, however. Thus the AD frequency may be twice the calculation frequency. In that case two AD values will be averaged for each calculation. Owing to the adaptation of the sampling rate according to the invention (variable rate principle), both frequencies rise or fall by the same factor. It is still necessary to average two AD values for each calculation.

If this schedule (AD frequency twice the calculation frequency) is applied to version 2, wherein the calculation frequency is fixed and only the AD frequency varies, it will be necessary in the highest (turbo) speed mode to average two AD values, because the AD conversion takes place at double the frequency then.

Figure 6:
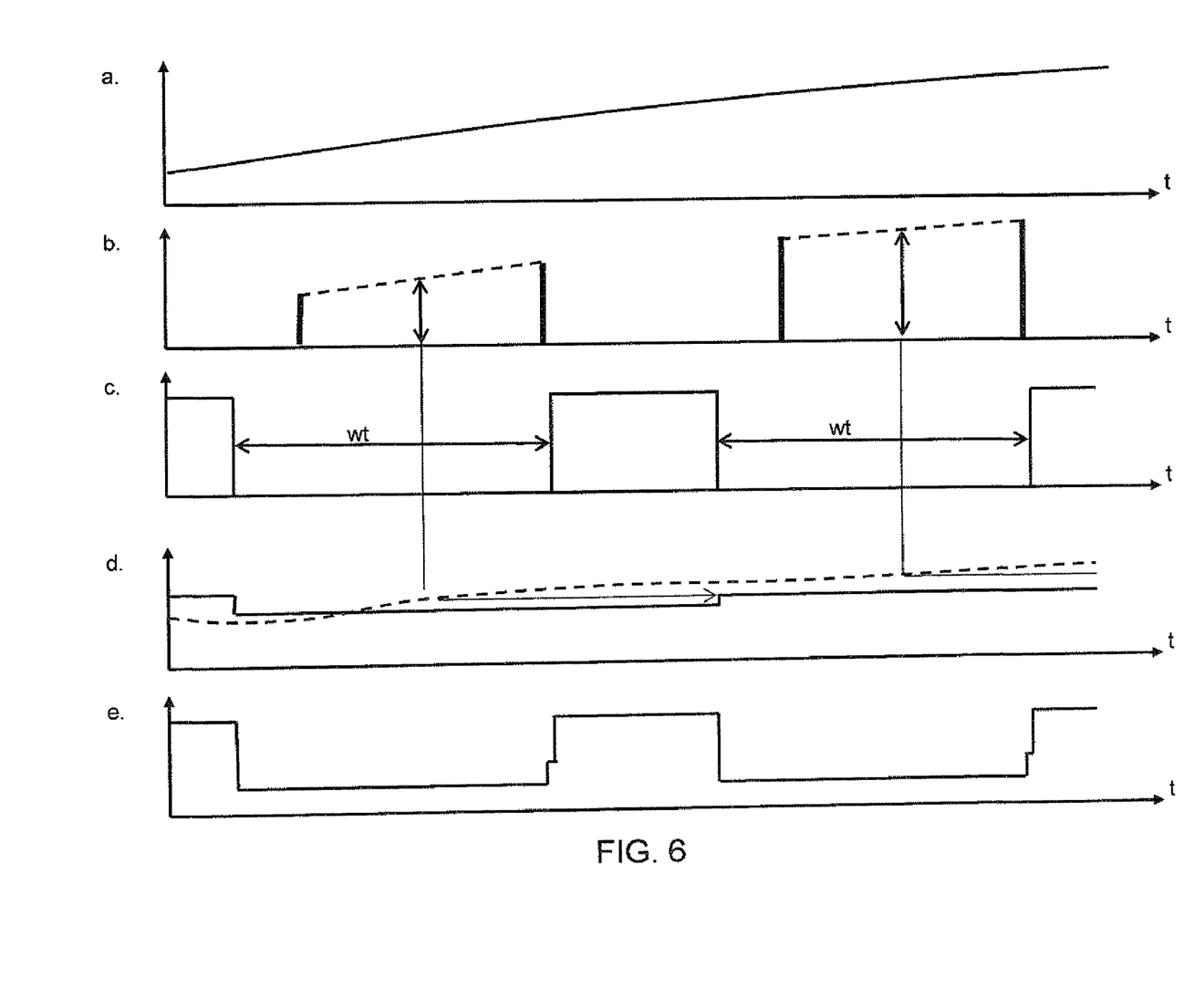
FIG. 6 shows the signal from a sensor for a portion of the displacement of FIG. 3, as well as the situation in which the average of two samples is used as the input for the calculation.

FIG. 6 shows the situation of two samples of which the average is used as the input for the calculation. This is the thick vertical arrow in FIG. 6b. The use of the average of two (or more) samples renders it possible to reduce the influence of noise on the measurements. Any measuring noise will also affect the calculation, resulting in noise in the flow registered by the instrument. To suppress this, a filter is added as a last step in the calculation (processing), more in particular a low pass filter.

In an embodiment, this filter is an exponential forget filter, which is a special version of a low pass filter (digital, first order). This filter is referenced 26 in the block diagram of FIG. 2. A value below 50 Hz is preferably chosen for the cut-off frequency, for example 30 Hz. This filter, however, at the same time slows down the response speed of the instrument, i.e. the reaction to the change in the flow. If there is less noise in the signals owing to the averaging of two or more samples as described above, this filter can be made 'faster', i.e. be given a higher cut-off frequency. This does increase the noise level, but it also provides a higher response speed of the instrument. At the slowest flow change in the calculation example last mentioned, both the sampling and the calculation take place with a frequency of 12 kHz. No averaging is possible then. In that case the low pass filter may be made 'slower' in order to reduce the noise.

Dissipation and energy consumption may be reduced in the following manner in the case of a slow change in the flow. Assume that the ADC samples at 24 kHz for a slow change in the flow. After each sample a new calculation takes place, i.e. also at 24 kHz. If the rate of change of the flow now increases, the ADC is made to sample more quickly, for example at 48 kHz. Processing continues to be at 24 kHz, however, so that two samples can be averaged together as described above. A desired compromise between noise and response speed may be chosen via the cut-off frequency of the output filter.

The waiting time between consecutive calculations is thus considerable in all cases and the average energy consumption of the processor is low. Only the ADC will start consuming more energy (and dissipating more heat) with faster changes in the flow. Thus the total energy consumption is even lower than in version 1. If calculations take place at 12 kHz, not one or two, but two or four samples are averaged each time.

Embodiments of Version 2 adaptation of the sampling frequency proportional to the rate of change of the flow such that more than one sample can be taken per calculation cycle, the average thereof then being taken as the input for the flow calculation;

adaptation of the sampling frequency to the rate of change of the flow in several discrete steps (for example two or three) such that more than one sample can be taken per calculation cycle, the average thereof then being taken as the input for the flow calculation;

doubling the sampling frequency above a predetermined rate of change in the flow such that four instead of two samples are taken per calculation cycle, the average thereof then being taken an the input for the flow calculation, which will be elaborated further below under the designation 'dual rate';

adapting the parameters of the low pass filter, which forms the final step in the flow calculation algorithm, in accordance with the rate of change of the flow.

A device for changing the sampling interval will be described below:

an Analog Devices AD 1939 Audio Codec chip comprising ADC and DAC functions is used. However, there are alternative suppliers of similar chips;

a software parameter called 'clock divider' in the Codec can be adapted by means of the software that is cyclically run on the processor. It determines with which frequency the ADC samples the analog signals. This frequency may lie at 24, 48, or 96 kHz for the AD 1939 when a typical clock crystal is used;

this sampling frequency will be higher by an integer number of times than the fixed repetition frequency of the calculations carried out by the calculation unit. Given a frequency of 12 kHz, the factor is accordingly 2, 4, or 8. The sensor signals indicate the instantaneous position of the tube. After each sampling, the ADC converts this position, i.e. an analog voltage, into a digital row of bits in its output buffer and provides a trigger signal to the calculation unit indicating that there are new data;

the calculation unit reads these data and stores them temporarily;

this is repeated for each sample taken during the waiting time between two calculations;

just before the start of the next calculation the calculation unit determines the average of the stored data (the tube positions) for each movement sensor. This accordingly relates to an averaging of 2 or 4 or 8 numbers per sensor in the present case;

the criterion for adapting the clock divider is the rate of change of the calculated flow, which is determined from two or more consecutive calculated values by the device, as described above.

'Dual Rate' Embodiment of Version 2

In this embodiment a 'stationary' and a 'dynamic' flow state are distinguished.

These states correspond to two values of the clock divider, resulting in sampling frequencies of 24 and 48 kHz of the ADC.

The processing cycle is always at 12 kHz

When the rate of change of the flow exceeds a certain limit, for example 50% of the adjusted range within 1 s, a switch is made to 'dynamic' for a certain fixed period, for example 10 s. The sampling frequency is doubled during this, from 24 to 48 kHz in the present case.

Is this limit is exceeded once more within said 10 seconds, the time period is reset to the start of the 10 seconds.

The average of two samples is taken as the input for the next calculation in the 'dynamic' mode.

In the 'dynamic' mode, moreover, the low pass filter forming the final step of the calculation is made faster by a fixed factor, for example a factor of 2.

The block diagram of FIG. 2 contains two blocks that are characteristic of the invention. These represent the speed variation monitor 29 and the sampling frequency adapter 30.

Background:

during the reconfiguration of the Codec (i.e. ADC/DAC) hardware by means of software, a higher sampling frequency may be chosen, if so desired (for monitoring the incoming analog signal). A higher sampling frequency generates more information and accordingly renders a higher accuracy possible. This higher input accuracy may be sacrificed so as to achieve the same input accuracy in spite of a 'faster' end filter setting; this leads to a faster response of the instrument while the same net output accuracy is maintained. The extra performance is at the cost of an increase in power consumption, resulting in an increase in the heat dissipation (offset by a higher sampling frequency). The measuring accuracy may be adversely affected thereby. Sometimes the one scenario (slow, cooler, same final accuracy) may be advantageous, at other times the other scenario (faster, hotter, same final accuracy).

The choice is made as follows: in those cases in which the user, or the flowmeter, knows that the measured quantity (i.e. the mass flow) is more or less constant, it is preferred to operate the measuring system in the cooler (and by way of compromise: slower) mode. In the case of fast changes in the measured quantity, it is preferred to operate the measuring system in the faster (and by way of compromise: hotter) mode.

The block 29 'speed variation monitor' is used for deciding which mode to choose. An example of the operation of such a block is given below. The invention, however, is not limited to this example.

1) The decision block looks at the rough flow signal before this enters the end filter.
2) It compares the instantaneous 'rough flow' with a predetermined value or with previous measurements (history).
3) If fast variations are detected (i.e. the measured value constantly differs strongly from previous values), the decision is taken to operate the instrument in the fast and hot (dynamic or turbo) mode.
4) In item 3) the definitions of 'constantly' (how often?) and 'differ strongly' (by how much?) may be derived, for example, from previous expert knowledge of the conditions under which the measuring instrument operates and from practical experience.
5) If a 'constant flow' is detected by the block (read-out is constant, unchanged in comparison with recent history), the block will decide to operate the instrument in the slow, cool mode.
6) A delay may optionally be incorporated in the decision block in order to prevent an undesirable switching to and fro between the modes, ensuring that the turbo mode, once switched on, will remain switched on for a certain period.
7) If there are any other methods of ascertaining that the measured quantity changes quickly or is about to change quickly (for example owing to a change in the setpoint made by the user), this information may be added for influencing the decision process. The decision process accordingly is based on, but not limited to, the factors described in items 1) to 7).
8) Two modes have been described above for operating the system: the normal or slow mode and the turbo mode ('dual rate'). Depending on the properties offered by the relevant hardware and software used, however, it will be possible to set a few intermediate modes, even up to a gradual variation.

The decision taken by the speed variation monitor on the mode to be chosen is fed to the 'sampling frequency adapter'. This is a 'pragmatic implementation block' which on the basis of the decision communicated to it sets the configuration parameters (at the input side) through an adjustment of the Codec (primarily the ADC part thereof) in order to sample the analog channels more or less often and at the same time to adjust the settings of the end filter such that it filters slowly or fast. Additionally, the block may be arranged to combine a plurality of input samples into a single sample of higher accuracy. This step leaves interposed processing steps unaltered, irrespective of whether a normal or turbo mode is active.

The invention is not limited to the use of a sampling frequency adapter as described by way of example above.

The use of a variable-speed AD conversion system with two speeds ('dual rate') has been explained above. An advantage of the dual rate system is that a choice can be made in the dynamic mode, i.e. choosing between less noise in the output signal and a faster response in the case of changes in the flow.

A practical choice is to double the response time for a given noise level. The reduced power consumption and heat dissipation of the stationary mode are obtained at the same time then.

Instead of a dual rate system, a system with a larger number of steps may be used, which may be set to different levels of choice between dissipation and performance. The changes may take place in a flowing, i.e. analog manner or in discrete steps in the speed ('speed stepping').

Summarizing, the invention relates to a Coriolis type flow measuring system for measuring the mass flow rate of a flowing medium, comprising a flow tube and sensors associated with the flow tube for generating analog signals, analog to digital conversion means for converting the analog sensor signals into digitized signals with a sampling frequency, and means for calculating the mass flow rate from the digitized signals, which system is provided with means for causing the sampling of the sensor signals to take place with a number of different frequencies, means for measuring the rate at which the flow changes, and means for selecting a predefined sampling frequency in dependence on the rate of change thus measured.

The invention claimed is:

1. A Coriolis type flow measuring system for measuring the mass flow of a flowing medium, comprising:
    a flow tube;
    drive means for causing the flow tube to oscillate about an axis of rotation;
    sensors associated with the flow tube for generating analog signals in positions in accordance with the movement of the tube;
    analog to digital conversion (ADC) means for converting the analog signals into digitized signals by means of a sampling process, and means for calculating a measuring signal from the digitized signals, which measuring signal is representative of the mass flow;
    means for enabling in the sampling process the sampling of each sensor signal to take place at different frequencies;
    flow rate change determining means for determining the rate at which the flow rate changes; and
    selection means for selecting in the sampling process a predefined low sampling frequency in case a low rate of change of the flow rate is determined by the flow rate change determining means and for selecting a predefined high sampling rate in case a high rate of change of the flow rate is determined.

2. A Coriolis type flow measuring system as claimed in claim 1, further comprising means for adapting the calculation frequency of the measured rate of change.

3. A Coriolis type flow measuring system as claimed in claim 1, wherein the calculation frequency is constant.

4. A Coriolis type flow measuring system as claimed in claim 1, wherein the sampling frequency can be selected between at least a first sampling frequency (stationary mode) and a second, higher sampling frequency (dynamic mode).

5. A Coriolis type flow measuring system as claimed in claim 4, wherein the second sampling frequency is a multiple of the first sampling frequency.

6. A Coriolis type flow measuring system as claimed in claim 4, wherein the selection means are designed to select the second sampling frequency when during implementation of the first sampling frequency the flow measured over a given time frame changes by more than a predetermined value.

7. A Coriolis type flow measuring system as claimed in claim 4, wherein the selection means are designed to select the first sampling frequency when during implementation of the second sampling frequency the flow measured over a given time frame changes by less than a predetermined value.

8. A Coriolis type flow measuring system as claimed in claim 4, wherein for both the stationary and the dynamic mode several samples per calculation cycle are determined of which the average is used in the calculation.

9. A Coriolis type flow measuring system as claimed in claim 8, wherein a larger number of samples is averaged in the dynamic mode than in the stationary mode.

10. A Coriolis type flow measuring system as claimed in claim 1, wherein the selection means are designed to maintain a selected sampling frequency during a predetermined period of time or until a next mass flow variation of the same kind occurs, in which case said predetermined period of time is started anew.

11. A Coriolis type system as claimed in claim 1, wherein the means for calculating the measuring signal are associated with a low pass filter.

12. A Coriolis type system as claimed in claim 11, wherein the parameters of said low pass filter are adapted in accordance with the sampling frequency.

13. A method of measuring the mass flow of a flowing medium with the use of a Coriolis type flowmeter comprising a flow tube and sensors associated therewith for providing sensor signals that are indicative of the movement of the tube, the method comprising:
    oscillating the tube about an axis of rotation;
    sampling the sensor signals with a sampling frequency so as to obtain digitized sensor signals;
    calculating a flow measuring signal from the digitized sensor signals with a calculation frequency, said measuring signal being representative of the mass flow;
    measuring the rate of change of the measuring signal; and
    adapting the sampling frequency to the value thus measured,
    wherein a high sampling frequency is used in the case of a high rate of change and a lower sampling frequency is used in the case of a lower rate of change.

14. A method as claimed in claim 13, wherein both the sampling frequency and the calculation frequency are adapted in dependence on the measured rate of change.

15. A method as claimed in claim 13, wherein the calculation frequency is constant.

16. A method as claimed in claim 13, wherein the adaptation of the sampling frequency is in discrete steps for predefined ranges of the rate of change of the flow measuring signal.

17. A method as claimed in claim 13, wherein the adaptation of the sampling frequency and of the flow calculation is in discrete steps for predefined ranges of the rate of change of the flow measuring signal.

18. A method as claimed in claim 13, wherein the adaptation of the sampling frequency is proportional to the rate of change, wherein one or more samples are taken per calculation cycle, the average of said samples being subsequently used as an input for the flow calculation.

19. A method as claimed in claim 13, wherein the adaptation of the sampling frequency to the rate of change is in a number of discrete steps, wherein one or more samples are taken per calculation cycle, the average of said samples being subsequently used as an input for the flow calculation.

20. A method as claimed in claim 19, wherein said number of discrete steps is at least two.

21. A method as claimed in claim 13, further comprising doubling of the sampling frequency above a predefined rate of change such that four instead of two samples are taken per calculation cycle, the average of said samples being subsequently used as an input for the flow calculation.

22. A method as claimed in claim 13, wherein the calculation of the flow measuring signal includes an algorithm that is associated with a low pass filter, wherein the parameters of said low pass filter are adapted in accordance with the sampling frequency.

* * * * *